United States Patent [19]

Matsumoto

[11] Patent Number: 5,309,847
[45] Date of Patent: May 10, 1994

[54] ADJUSTABLY MOVABLE WORK TABLE

[75] Inventor: Hiroshi Matsumoto, Iwata, Japan

[73] Assignee: NTN Corporation, Osaka, Japan

[21] Appl. No.: 19,341

[22] Filed: Feb. 18, 1993

Related U.S. Application Data

[63] Continuation of Ser. No. 691,919, Apr. 26, 1991, abandoned.

[30] Foreign Application Priority Data

Apr. 27, 1990 [JP] Japan .................. 2-45308[U]

[51] Int. Cl.$^5$ .................................................. A47B 1/00
[52] U.S. Cl. .................................. 108/143; 248/913; 74/479 PH
[58] Field of Search ............... 108/143, 20; 74/479; 248/913, 276, 298

[56] References Cited

U.S. PATENT DOCUMENTS

| | | | |
|---|---|---|---|
| 3,563,186 | 2/1971 | Piper | 108/143 |
| 3,801,090 | 4/1974 | Gillen | 248/913 X |
| 4,189,953 | 2/1980 | Volk | 108/143 X |
| 4,233,740 | 11/1980 | Bunn et al. | 248/913 X |
| 4,372,223 | 2/1983 | Iwatani | 108/143 |
| 4,972,574 | 11/1990 | Isono et al. | 74/479 X |

OTHER PUBLICATIONS

NTN Toyo Bearing Co., Patent Abstracts of Japan, vol. 13, No. 25 (M-787) Jan. 20, 1989 & JP-A-63 237 831 *abrégé*.

Koshiba Yoshihito, Patent Abstracts of Japan, vol. 12, No. 197 (M-706) Jun. 8, 1988 & JP-A-63 002 637 *abrégé*.

*Primary Examiner*—Peter A. Aschenbrenner
*Attorney, Agent, or Firm*—Armstrong, Westerman, Hattori, McLeland, & Naughton

[57] ABSTRACT

A movable table having two yokes mounted one above the other so as to be movable in two directions perpendicular to each other. Stage guides are provided on top surfaces of the yokes to extend in a direction perpendicular to the moving direction of the yokes. The upper yoke is formed with a through hole having a length determined by the length of the stage guides thereof. A stage is mounted above said yokes at the intersection of the yokes. On the bottom surface of the stage, there are provided slide bearings held in engagement with the stage guides of the upper yoke and slide bearings extending through the through hole in the upper yoke and held in engagement with the stage guides on the lower yoke.

4 Claims, 7 Drawing Sheets

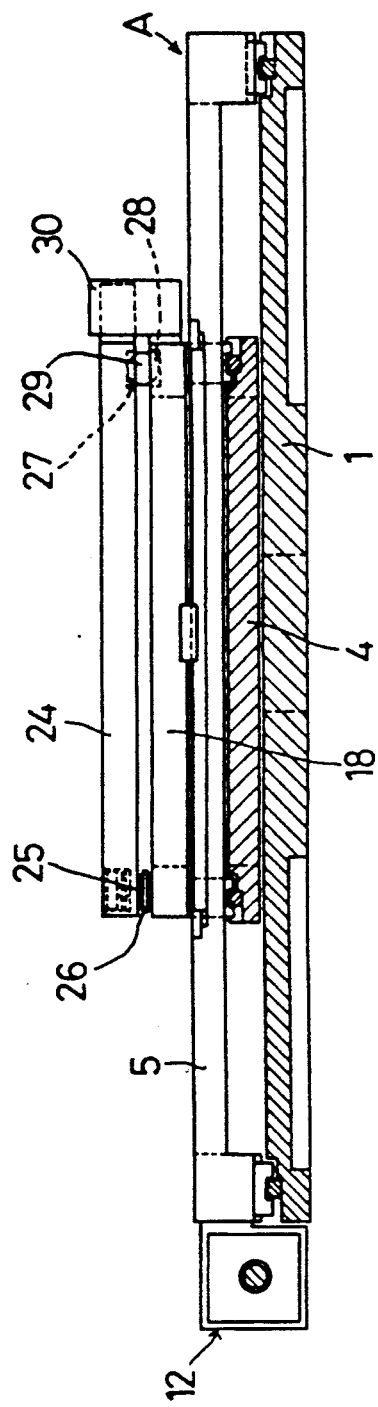
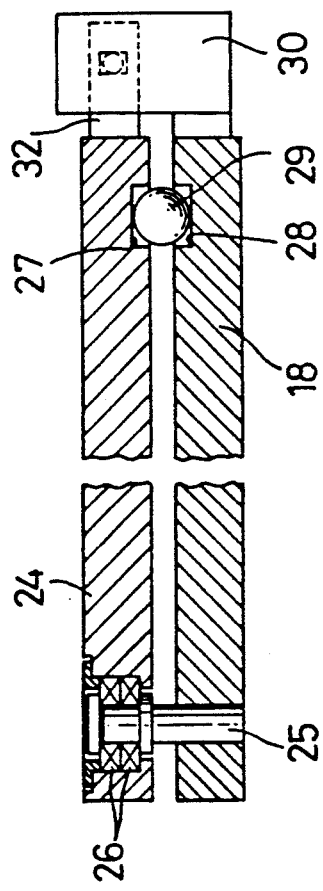
FIG. 9
FIG. 10

ADJUSTABLY MOVABLE WORK TABLE

This application is a continuation application of Ser. No. 07/691,919 filed Apr. 26, 1991 abandoned.

This invention relates to a movable table for use in moving a work to a predetermined position on a plane.

A prior art movable table is disclosed in Japanese Unexamined Patent Application 63-237831.

As shown in FIGS. 11 and 12, this prior art table is provided on the top surface of its base table 41 with a pair of linear bearings 42 and 43 extending perpendicular to each other to support X-axis and Y-axis yokes 44 and 45, respectively, so that they can be moved perpendicular to each other.

The yokes 44 and 45 are formed with guide holes 46 and 47, respectively, which are elongated in the directions perpendicular to the directions in which the respective yokes move. A plurality of guide rollers 49 and 50 are provided on a stage 48 disposed at the intersection of the guide holes 46 and 47 so as to be in contact with the inner side surfaces of the guide holes 46 and 47. The stage 48 is supported by the rollers 49 and 50 so as to be movable along the guide holes 46 and 47.

Further, linear drive units 51 and 52 are mounted on the top surface of the base table 41 to move the yokes 44 and 45 parallel to the respective linear bearings 42 and 43.

In this arrangement, when either the X-axis yoke 44 or the Y-axis yoke 45 moves, the stage 48 will be moved either in the X-axis or Y-axis direction, guided by the rollers 49 and 50 and the guide holes 46 and 47.

But in case of the above-described movable table, the guide holes 46 and 47 have to have a large width sufficient to receive the guide rollers 49 and 50 therein. Such yokes 44 and 45 are in the shape of elongated picture frames as shown in FIG. 11. Thus, their rigidity is low and if a heavy work is placed on the stage 48, the yokes 44 and 45 can be easily deformed.

Also, in case of a device which utilizes a light passing through the table, such as a liquid crystal display detecting mechanism, the table has to be aligned with the light with high accuracy. In such a case, a work table is required which can be moved in two directions perpendicular to each other and which is pivotable to permit fine angle adjustment.

In order to give a prior art movable table such pivoting function, it has to be mounted on a rotary table having an angle indexing function. This will complicate the structure of the table and lead to increase in height and thus size.

The first object of the present invention is to provide a movable table which has a yoke having an increased rigidity and which can be operated stably with high accuracy.

The second object is to provide a movable table which is rigid in structure and compact in size and which can be moved in two directions perpendicular to each other and can make a pivoting motion.

In accordance with the present invention, there is provided a movable table comprising a base table, two yokes mounted on the base table one above the other so as to be movable in two directions perpendicular to each other, the yokes being provided with stage guides provided on top surfaces thereof to extend in A direction perpendicular to the moving direction of the yokes, the upper yoke being formed with a through hole having a length determined by the length of the stage guides thereof, a stage mounted above the yokes at the intersection of the yokes, the stage being provided with first slide bearings mounted on the bottom surface thereof in engagement with the stage guides on the upper yoke, and second slide bearings mounted on the bottom surface thereof and extending through the through hole in the upper yoke so as to be in engagement with the stage guides on the lower yoke.

In the above-described movable table, by the engagement between the stage guides and the slide bearings extending perpendicular to the moving direction of the yokes, the stage and the yokes are coupled together with respect to the moving direction of the yokes. Thus, by moving the upper yoke, the stage moves along the stage guides on the lower yoke, whereas by moving the lower yoke, the stage moves along the stage guides on the upper yoke.

In this arrangement, since the upper yoke has only to be formed with the through hole for receiving the slide bearings of the stage, each yoke can be formed into the shape of a wide plate. This serves to increase the rigidity of the yokes.

In accordance with the present invention, a pair of yoke guides are mounted on the top of the base table and extending perpendicular to each other to support the yokes. The yokes are provided with a pair of slide bearings on the bottom thereof. The slide bearings are kept in engagement with the yoke guides on the top surface and both sides thereof, and a pair of drive units mounted to sides of the base table and coupled to the yokes for driving the yokes.

Since the yokes can be mounted at a lower level and the height of the table can be reduced by the amount equal to the height of the drive unit, the table is compact.

Further, in the above structure, by providing each yoke with a light passing hole elongated in the direction of the length of the stage guides provided on the other yoke and having a length corresponding to the moving stroke of the stage guides and the slide bearings, the light passing hole formed in each yoke can be minimized in size and the rigidity of the yokes can be kept high.

In order to achieve the second object, a carriage is mounted on the stage through thrust bearings and pivotally coupled to the stage through a vertical shaft fixed to the stage, and a drive unit is mounted on the stage and coupled to the carriage through a pivotable joint.

In the above structure, the carriage is supported so as to be pivotable with respect to the stage guided by the thrust bearings about the shaft. Thus, the carriage can be pivoted about the shaft by any desired angle by actuating the drive unit. Also, by adding the above-described motion of the stage to this pivoting motion, the carriage can be moved to a desired position on a plane in a straight line or turned in a desired direction.

In the above structure, since only thrust bearings are interposed between the stage and the carriage, the height of the table can be reduced.

Other features and objects of the present invention will become apparent from the following description taken with reference to the accompanying drawings, in which:

FIG. 9 is a sectional view taken along line III—III of FIG. 8;

FIG. 10 is a vertical sectional front view of a portion of the same;

FIRST EMBODIMENT

FIGS. 1 to 7 show the first embodiment of this invention.

As shown in the figures, two pairs of yoke guides 2 and 3 are mounted on a base table 1 to extend in parallel to two directions perpendicular to each other along the respective side and plan views. X-axis and Y-axis yokes 4 and 5 are mounted on the yoke guides 2 and 3, respectively. They are disposed one above the other and extend perpendicular to each other.

The X-axis and Y-axis yokes 4 and 5 are supported on the respective yoke guides 2 and 3 through slide bearings 6 and 7, respectively, mounted on the underside of the yokes 4 and 5 at both ends and engaged in the respective yoke guides 2 and 3.

Figure 1:
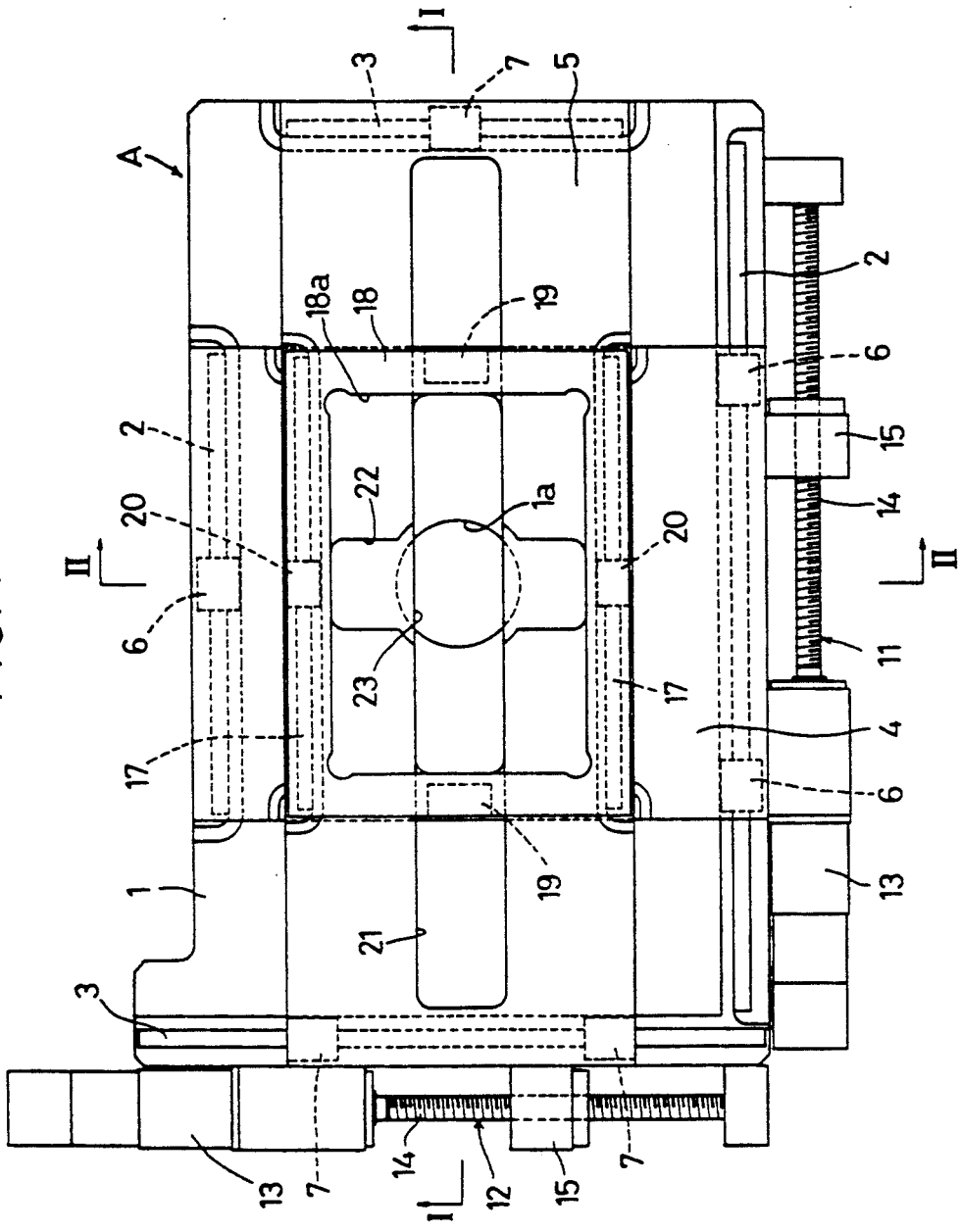
FIG. 1 is a plan view of the movable table of the first embodiment.
Figure 2:
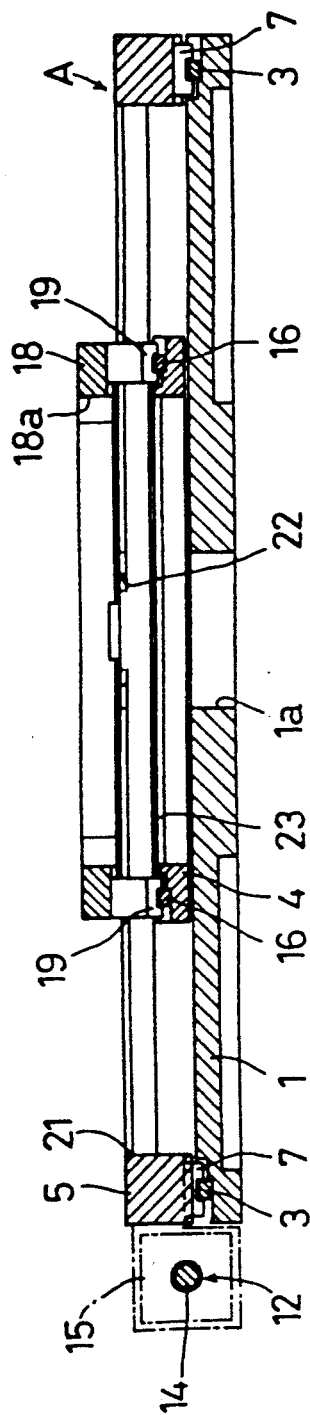
FIG. 2 is a sectional view taken along line I—I of FIG. 1.
Figure 3:
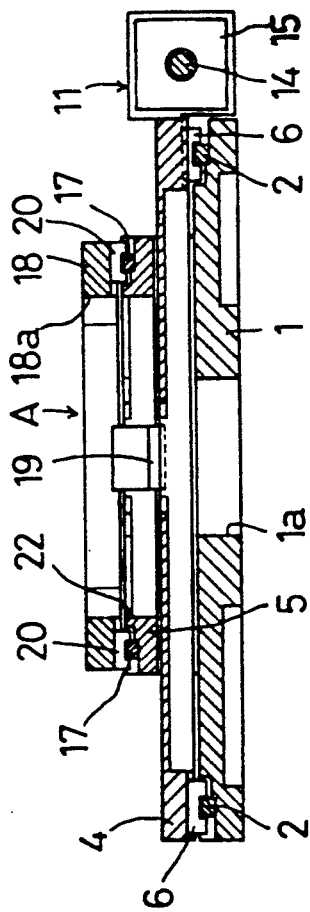
FIG. 3 is a sectional view taken along line II—II of FIG. 1.
Figure 4:
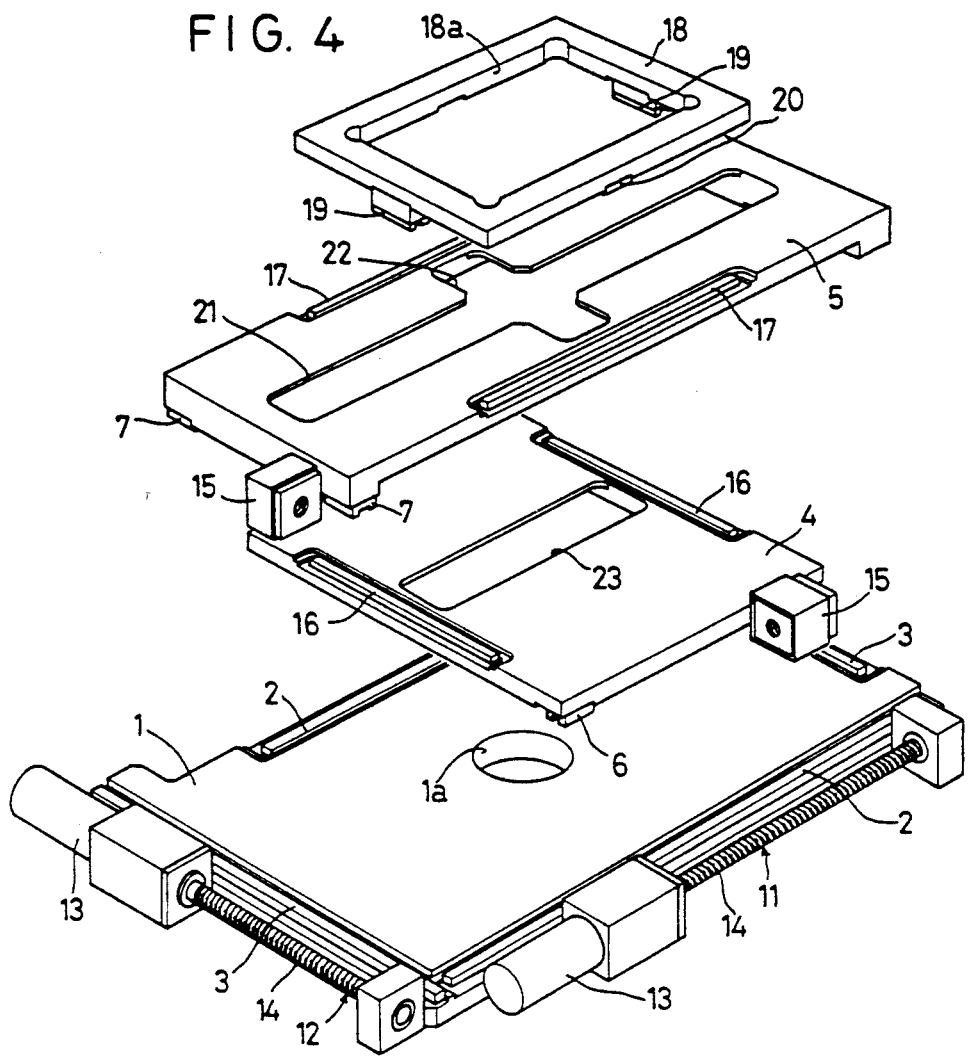
FIG. 4 is an exploded perspective view of the same.
Figure 5:
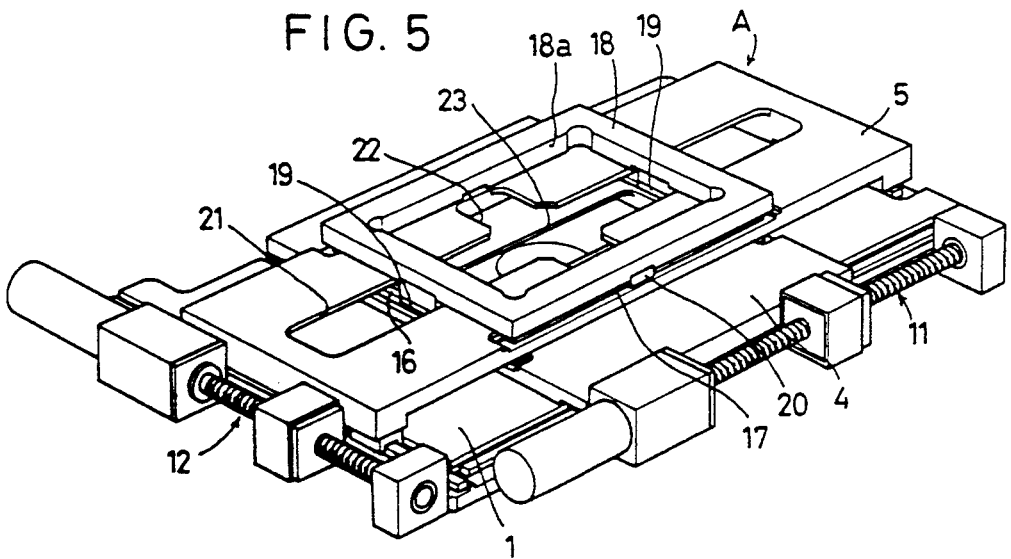
FIG. 5 is a perspective view of the same showing its assembled stage.
Figure 6:
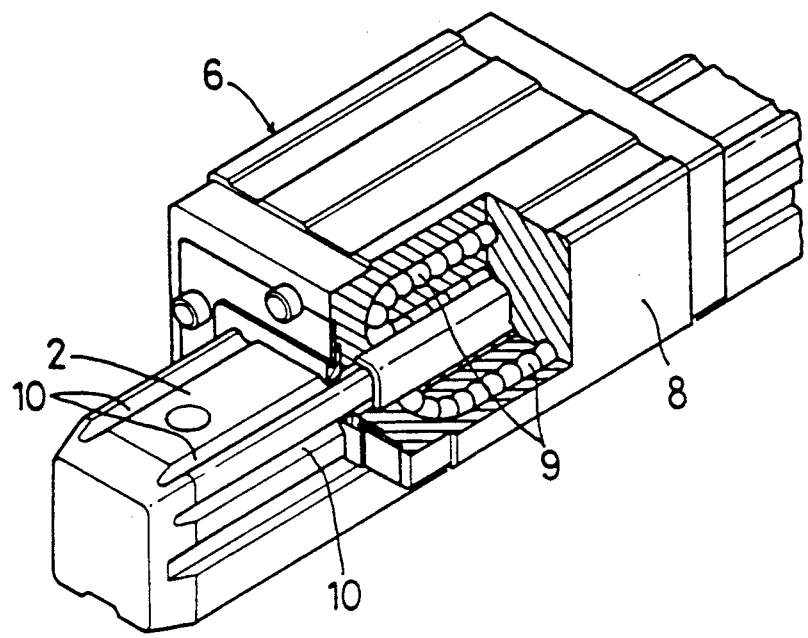
FIG. 6 is a partially sectional perspective view of the slide bearing and the guide in engagement with each other.
Figure 7:
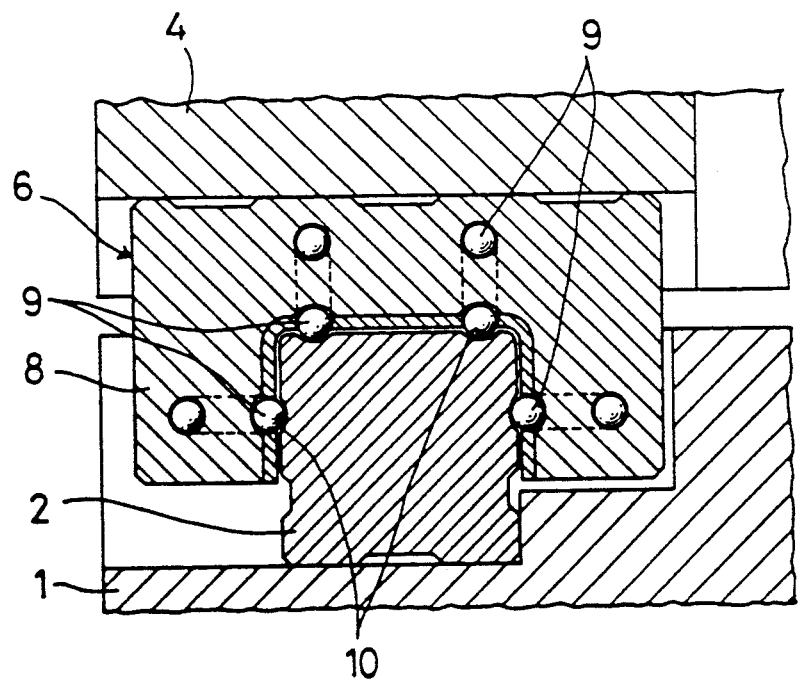
FIG. 7 is a vertical sectional side view of the same.

As shown in FIGS. 6 and 7, each slide bearing 6 comprises a ]-shaped slide body 8 mounted on the yoke guide 2 and a plurality of balls 9 rollably mounted in passages formed in the slide body 8 for contact with the top and sides of the yoke guide 2. The slide bearing 6 and the corresponding yoke guide 2 constitute a linear bearing. The yoke guides 2 are formed with grooves 10 for guiding the balls 9.

The slide bearing 6 is free to move in the longitudinal direction of the yoke guide 2 by means of the rolling balls 9 but is prevented from moving in the direction perpendicular to the yoke guide 2 since the balls 9 come into engagement with the guide 2. Stage guides 16 and 17 and slide bearings 19 and 20, which are to be described later, also constitute linear bearings having the same engaging structure.

One of the pair of the yoke guides 2 and 3 is longer than the other. Drive units 11 and 12 are mounted on the base table 1 at the side where the longer guides are mounted to move the X-axis yoke 4 and Y-axis yoke 5 in a straight line.

Each of the drive units 11 and 12 comprises a motor 13, a threaded shaft 14 rotated by the motor 13 and a nut 15 in threaded engagement with the threaded shaft 14. The nuts 15 are secured to the sides of the yokes 4 and 5. In this arrangement, when the threaded shafts 14 are turned by the motors 13, the nuts 15 will move along the threaded shafts 14, thus moving the yokes 4 and 5 along the yoke guides 2 and 3 in a straight line, respectively.

The drive units 11 and 12 are so mounted that their top ends will be flush with the top surface of the Y-axis yoke 5 when assembled. As the drive units 11 and 12, ball threaded shaft devices as proposed in U.S. patent application 07/549,836 may be used.

Stage guides 16 are mounted on the top surface of the X-axis yoke 4 at both sides thereof to extend in the direction perpendicular to the direction of movement of the yoke 4, i.e. in the direction perpendicular to the yoke guide 2 mounted on the base table 1. On the other hand, stage guides 17 are mounted on the top surface of the Y-axis yoke 5 at both sides thereof to extend in the direction perpendicular to the yoke guide 3.

The Y-axis yoke 5 is formed with a through hole 21 extending parallel to the stage guides 17. The slide bearings 19 mounted on the bottom of the stage 18 can be inserted in the through hole 21, which is slightly longer than the stroke of the slide bearings 6 as they move along the yoke guides 2 and extends along the stage guides 17 in parallel thereto.

On the other hand, a stage 18 in the shape of a picture frame is provided at the intersection of the X-axis yoke 4 and the Y-axis yoke 5. Slide bearings 20 are secured to the bottom of the stage 18 at opposite sides thereof and adapted for engagement with the stage guides 17 on the Y-axis yoke 5. Further, slide bearings 19 are mounted on the bottom of the stage 18 at the opposite sides perpendicular to the first-mentioned opposite sides thereof. The bearings 19 extend through the hole 21 of the Y-axis yoke 5 and are held in engagement with the stage guides 16 on the X-axis yoke 4.

The Y-axis yoke 5 is formed centrally with a light passing hole 22 extending in a direction perpendicular to the through hole 21. The light passing hole 22 is slightly longer than the distance by which the slide bearings 19 move along the stage guides 16, i.e. the stroke of the stage 18 in the Y-axis direction.

Further, the X-axis yoke 4 is formed with a light passing hole 23 elongated in the moving direction of the yoke 4. The light passing hole 23 is slightly longer than the distance by which the slide bearings 20 moves along the stage guides 17, i.e. the stroke of the stage 18 in the X-axis direction.

The light passing hole 23 in the X-axis yoke 4 and the light passing hole 22 in the Y-axis yoke 5 are so arranged that even if the stage 18 moves to the maximum limit in the X- or Y-axis direction, a light passing hole 1a formed in the base table 1 is kept open, thus preventing the light passing through the hole 1a from being interrupted.

In the movable table A of this embodiment, when the X-axis yoke 4 moves along the yoke guides 2, the stage 18 will move along the stage guides 17 on the Y-axis yoke 5 in the X-axis direction since the stage guides 16 on the X-axis yoke 4 are in engagement with the slide bearings 19.

In contrast, when the Y-axis yoke 5 moves along the yoke guides 3, the stage 18 will move in the Y-axis direction along the stage guides 16 on the X-axis yoke 4 due to the engagement between the stage guides 17 and the slide bearings 20.

Even when the stage 18 moves, the top opening of the light passing hole 1a in the base table 1 is kept open through the light passing hole 23 in the X-axis yoke 4, the light passing hole 22 in the Y-axis yoke 5 and a hole 18a formed in the stage 18. This permits the light from the hole 1a to reach the top of the stage 18 without being interrupted. Thus, work on the stage 18, such as detection of defects in liquid crystal or other display devices, can be done stably.

Figure 11:
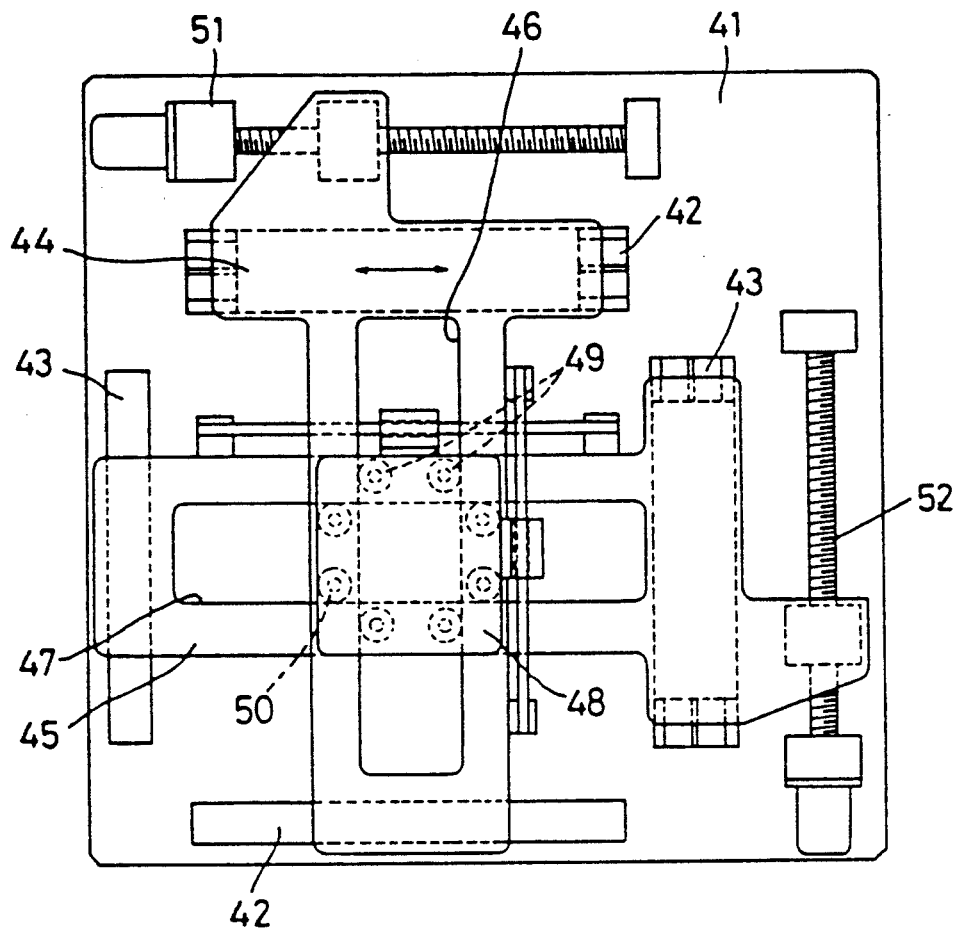
FIG. 11 is a plan view of a prior art example.

In the above-mentioned structure, the through hole 21 and the light passing holes 23 and 22 formed in the X-axis yoke 4 and the Y-axis yoke 5 are narrow and the yokes 4 and 5 have a rather flat plate shape of a sufficient width. Thus, the rigidity of the yokes 4 and 5 is considerably higher compared with the conventional structure shown in FIG. 11 in which the yokes are in the shape of picture frames.

Figure 12:
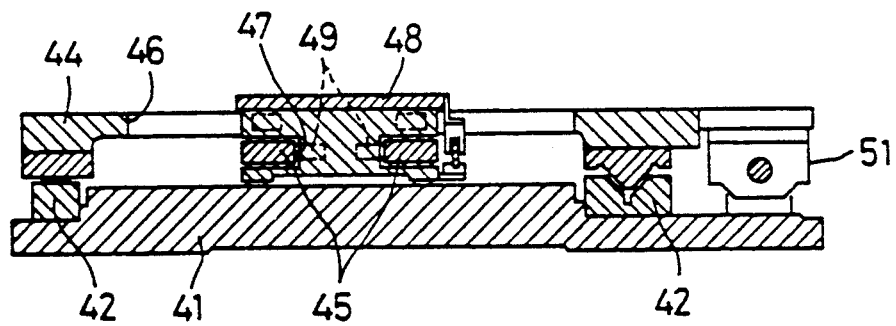
FIG. 12 is a vertical sectional front view of the same.

Further, since the yokes 4 and 5 are supported on the slide bearings adapted to be fitted on the yoke guides so as to reach both sides thereof, the yokes 4 and 5 can be mounted at a lower level than in the structure shown in FIG. 12 in which the guide rails are supported at upper portions thereof through the bearings. Further, since the drive units 11 and 12 are mounted on the sides of the base table 1 so as to be located at the same level as the Y-axis yoke 5, the height of the table can be reduced considerably.

SECOND EMBODIMENT

Figure 8:
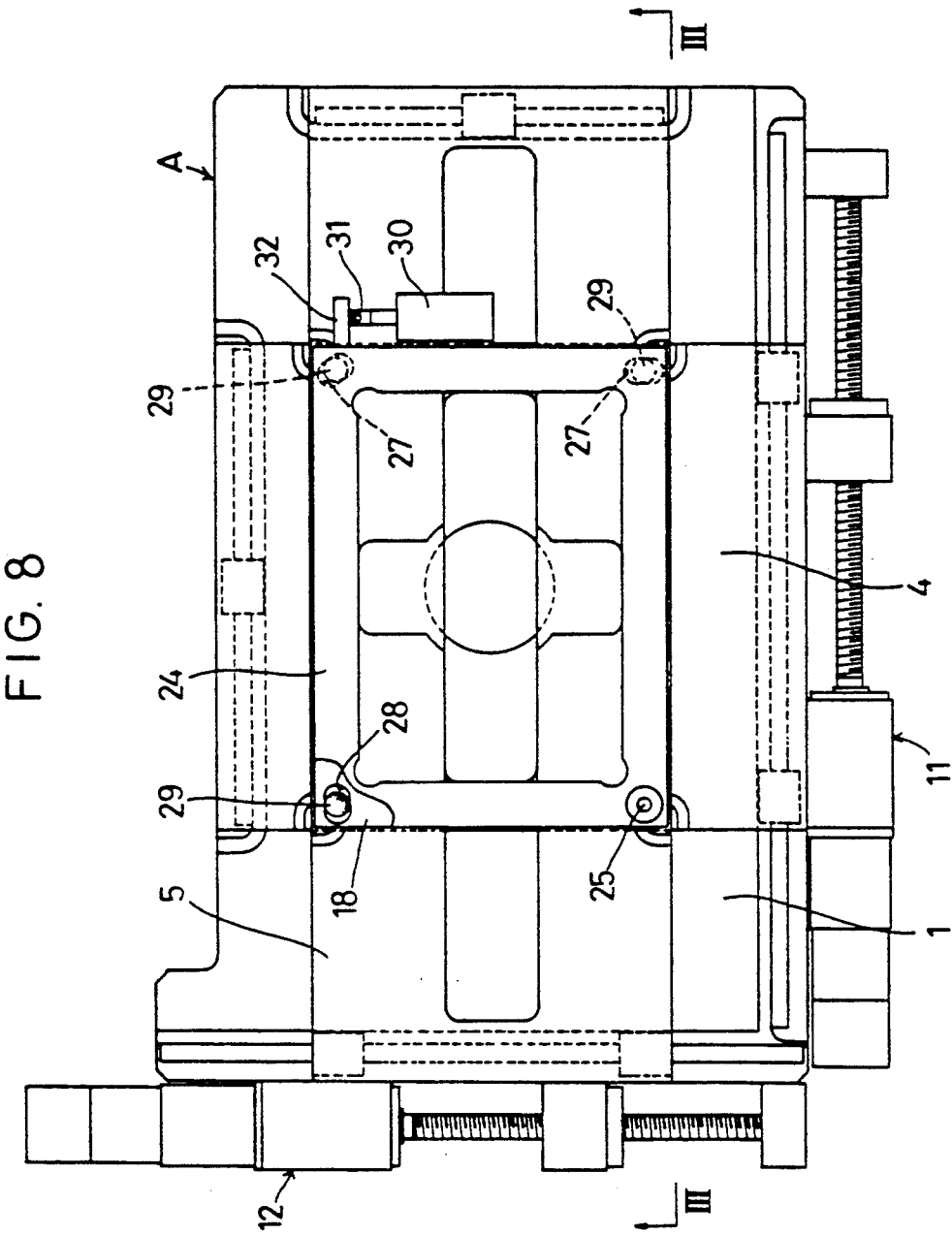
FIG. 8 is a partially cut-away plan view of the movable table of the second embodiment.

FIGS. 8 to 10 show the second embodiment in which a carriage 24 is mounted on the stage 18 of the movable table A to allow a pivotal movement.

The carriage 24 has the same picture-frame shape as the stage 18, and is movably connected at one corner thereof to a vertical shaft 25 fixed to one corner of the stage 18 through two angular bearings 26.

Further, the stage 18 and the carriage 24 are formed at the three corners other than the above-mentioned corner with opposed arcuate grooves 27 and 28. In each pair of the grooves, balls 29 as rolling element in the thrust direction are mounted.

A drive unit 30 is fixedly mounted on the stage 18 at the side opposite to the side where the shaft 25 is mounted. The shaft of the drive unit 30 is pivotally and slidably connected through a pin 31 to a stay 32 extending from the carriage 24.

In this arrangement, by stretching or retracting the drive unit 30, the carriage 24 pivots around the shaft 25, guided by the rolling motion of the balls 29.

Besides the pivoting motion, by moving the stage 18 in the X- or Y-axis direction together with the yokes 4 and 5, the carriage 24 can be moved in any direction or to any position on one plane. Thus, fine adjustment of alignment is possible.

In the above embodiment, the balls 29 are used to guide the stage 18 and the carriage 24. But rolling bearings, static pressure bearing and thrust bearings such as slide contact bearings may be used to guide them.

What is claimed is:
1. A movable table comprising:
   a generally rectangular base defining a plane having mutually perpendicular X and Y directions;
   a first pair of elongated guides mounted on a first pair of opposite ends of a top surface of said base and extending parallel to each other in said X direction;
   a second pair of elongated guides mounted on the other pair of opposite ends of said base and extending parallel to each other in said Y direction;
   a first yoke mounted on said base and engaged with said first pair of guides for linear movement with respect to said base in said X direction, said first yoke having a first pair of elongated parallel spaced stage guides on a top surface of said first yoke and extending in said Y direction;
   a second yoke mounted on said base above said first yoke and engagable with said second pair of yoke guides for linear movement with respect to said base in said Y direction, said second yoke having a second pair of spaced, elongated, parallel stage guides on a top surface of said second yoke and extending in said X direction, said second yoke being formed with an elongated, light-passing hole extending in the direction of length of said second stage guides and having a length determined by the length of said second stage guides;
   a generally rectangular stage mounted on said base above said second yoke;
   a first pair of parallel slide bearings extending in the Y direction from a first pair of opposite sides of a bottom surface of said rectangular stage and through said light passing hole in said second yoke and engagable with said first pair of stage guides on said first yoke; and
   a second pair of parallel slides bearings extending in said X direction from a bottom surface of said stage and engaged with said second pair of stage guides on said second yoke.

2. A movable table according to claim 1, wherein each of said yokes has a pair of slide bearings on a bottom of the yoke engagable with and supporting said yokes on said yoke guides, and a pair of drive units mounted on sides of said base and coupled to said yokes for driving said yokes.

3. A movable table according to claim 1, wherein said first yoke is formed with a light-passing hole extending in light-passing alignment with said light-passing hole in said second yoke and having a length corresponding to a moving stroke of said slide bearing on said first yoke.

4. A movable table according to any one of claims 1-3, further comprising a generally rectangular carriage, one corner of said carriage being pivotally mounted about a vertical shaft, the other three corners of said carriage being movable connected to said stage by means of angular bearings, a drive unit mounted on said stage, and extendable and rectractable means connecting said drive unit to said carriage whereby, by extending and retracting said means, said carriage pivots about said shaft guided by a rolling motion of said angular bearings, and whereby said carriage can be pivoted in any direction and, by movement of said yokes in the X and Y directions, said carriage can be moved to selected positions in the X-Y plane.

* * * * *